Nov. 14, 1939.   W. E. KNIGHT, JR   2,180,150
TOBACCO CULTIVATING IMPLEMENT
Filed June 21, 1938
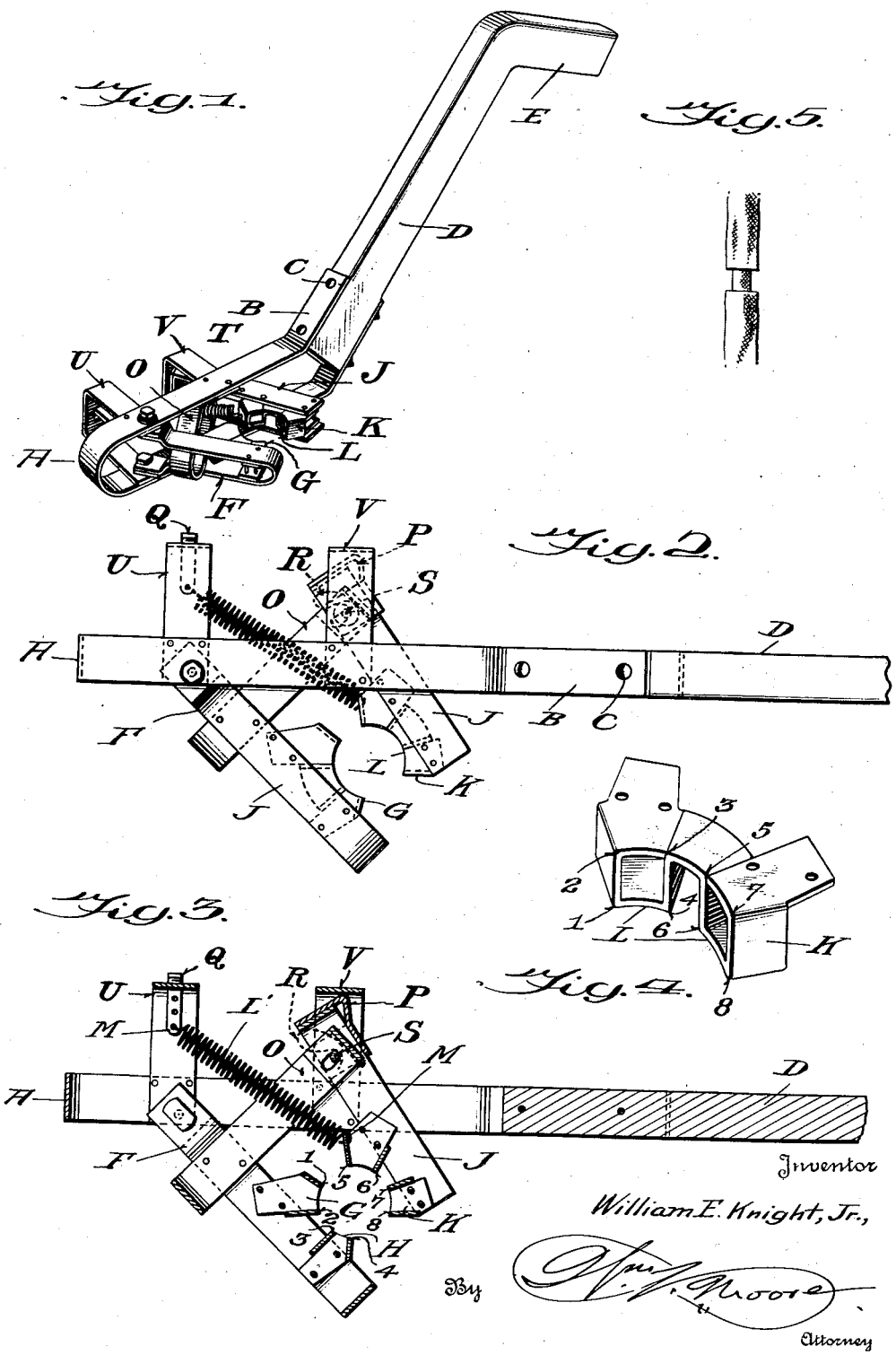

Patented Nov. 14, 1939

2,180,150

UNITED STATES PATENT OFFICE 2,180,150

TOBACCO CULTIVATING IMPLEMENT

William Eagleton Knight, Jr., Howel, Ky.

Application June 21, 1938, Serial No. 215,035

9 Claims. (Cl. 47—57)

My invention relates to improvements in tobacco cultivating implement and refers particularly to a tool or implement commonly known and referred to by tobacco growers as a "belter", "stalk girdler", "stalk barker", or "plant deadener."

The main object of my invention is the provision of a tool or implement used primarily for the removing of a strip or belt of bark from the stalk of growing tobacco plants for the purpose of stopping the flow of plant nourishment, commonly called sap, from the roots of the plant to its body and leaves thereby terminating further growth of the stalk and leaves of the plant and forcing the leaves to cure at the desired stage of their growth. This forced curing of the leaves at the desired stage prevents overgrowth of the plant leaves insuring a finer quality of leaves by forestalling the overgrowth and the consequent coarseness that comes therefrom and the lessening of quality if the overgrowth occurs due to unseasonable weather or other causes.

Another object of my invention is the provision of an implement of the character and for the purpose stated which can be instantly placed in position upon the stalk of the plant and which will quickly cut the strip of bark from the plant in a most efficient manner and which can be manufactured and sold at a reasonable price. Tools now used for performing this operation on the stalks necessitate the user working in a stooped position and the twisting of the tool horizontally with the hand carrying the tool. This method is very tiresome both to the back of the user, because of the almost continual stopped position necessary and to the user's wrist and forearm because of the gripping and twisting. My implement allows the user to stand practically erect when using it which eliminates the excessive stooping. It is only necessary to place my tool around the stalk near the ground, pull it toward the user by the handle to its extreme working position and then push it by the handle from the user back to its original position which automatically sets the jaws for the next stalk as the implement is removed from the belted stalk thereby eliminating all gripping and twisting required of the hand, wrist and forearm.

Despite the fact that the process commonly referred to as "belting", "stalk girdling", "stalk barking" or "plant deadening" adds much to the quality and therefore increases the amount received for the tobacco thus treated the growers have, because of the excessive and tiresome work incident to performing the operation with tools now in use, been exceedingly hesitant to perform the task thereby causing themselves to fail to receive as much for their product as they would have had the stalks been so treated. It is believed that due to the ease and simplicity with which the operation can be done by the use of the implement invented by me that the above referred to process will become more generally used by the growers thereby adding to the quality of their product and increasing the income therefrom.

To attain the desired objects above referred to, my invention consists of an implement of the character and for the purposes described embodying novel features of construction and combination of parts substantially as described and claimed and as shown in the accompanying drawing, in which:

Figure 1 represents a perspective view of a tobacco cultivating implement constructed in accordance with and embodying my invention.

Figure 2 represents a top plan view.

Figure 3 represents a horizontal sectional view of the complete implement.

Figure 4 represents a detail view of the cutting members or elements of my tool or implement.

Figure 5 represents a detail view of the stalk or stem of a tobacco plant showing the cut in the bark of the stalk or stem.

The aim of my invention is the production of a simple, inexpensive and efficient tool or implement for performing the function of "belting", "barking", "deadening" or "girdling" the stalk of a tobacco or any other plant, and according to my invention the tool comprises a yoke shaped frame A, disposed in a horizontal plane, having its open end B bent at a suitable angle to receive the securing means or fastening C for the lower end of the handle D, having a grasping portion E formed to provide a suitable hand grip for the user.

To the main frame near its outer end is secured the pair of parallel bars F which have one of the cutting and scraping members or teeth attached therein which cutting and scraping members or teeth are detailed in Figure 4 and which will be fully described in a later paragraph. The parallel bars F consist of a bar of metal bent so that the inside distance between the bars is the same as the outside depth of the cutting members or teeth, (Figure 4) thereby allowing the cutting members or teeth to fit snugly between the bars so that they may be fastened at the top and bottom points to the parallel bars. The strip of metal bent to form the parallel bars is by folding of the ends for additional thickness and by forming near the folded ends of an offset made to fit into the main frame or yoke A and is attached thereto so that it will work freely in said yoke A by openings in the yoke A in both upper and lower parts and corresponding openings in the bent and offset ends of the parallel bars F into which shoulder bolts are inserted equipped with nuts making a bearing at these two points. Sufficient clearance is thereby left for coil spring L in Figure 3 to pass between the ends of the parallel bars and shoulder bolts of F and the parallel bars O as the parallel bars F swing to their maximum working position and are stopped against yoke A.

Attached rigidly to the inside of parallel bars F in the proximity of the formed offset are parallel bars O formed of a strip of metal bent to dimensions so that the outside dimension of O is the same as the inside dimension of parallel bars F thereby allowing parallel bars O to fit snugly into the inside of parallel bars F and to be fastened to each other permanently. On the ends of parallel bars O opposite from the point where O is attached to F are slotted holes marked S used to attach the parallel bars O to parallel bars J and which will be further referred to later. The ends of the parallel bars O are bent so that they lap over making this end of O square whereas the opposite end is rounded.

Parallel bars J are formed the same distance apart as parallel bars F—that is the inside distance of parallel bars J is the same as the outside distance of the cutting members or teeth—so l ke parallel bars F parallel bars J have a set of cutting members or teeth attached thereto, the teeth or cutting members for parallel bars J and F being the same outside depth. The cutting and scraping members or teeth attached to parallel bars J are not attached so that they conform exactly to the cutting members or teeth attached to parallel bars F and they are so attached for reasons that will be detailed later. The end of parallel bars J in which the cutting members or teeth are mounted is left open but the opposite end of the parallel bars J is bent at right angles. Near the end of parallel bars J opposite from the end carrying the cutting members round holes are made to receive a pin and to correspond with slotted holes S which pin attaches parallel bars O to parallel bars J so that parallel bars J will hinge on parallel bars O.

Trigger P consists of metal formed with three projections or prongs two of which are formed parallel so that the inside dimensions are the same as the outside dimensions of parallel bars J so that they will slip over the parallel bars J. These two projections are the approximate length of the width of the parallel bar J and have round holes near their ends to correspond with the round holes in parallel bars J and with the slotted holes in parallel bars O. The third projection is formed so that when the holes in the other two projections conform to the holes in the parallel bars J and O that this third projection rests square against the square end of parallel bar J. The offset or hump on P catches against the member V so that the parallel bars F and parallel bars J, both containing the cutting members or teeth will remain open when the tool is set for work and will close when the cutting members are brought into contact with the plant stalk and the implement is pulled toward the user with the handle. The pin holding the parallel bars O, the parallel bars J and the trigger P passes through all three of these members.

The flat U shaped spring marked R is formed so that when placed that one end is anchored in the inside of the square end of parallel bars O where they lap. The other end of spring R is shaped to conform to the body of the pin passing through the holes in the trigger P, and the holes or slots in parallel bars J and O and is placed on this pin to exert pressure on it to hold it in the proper place.

The part marked V is a strip of metal formed with two right angles with the outside dimension the same as the inside dimension of yoke A and both ends are rigidly fastened to yoke A. The purposes of part V are: (1) to allow the setting of trigger P: (2) to serve as a stop for the moving members of the parallel bars F, J and O: (3) to serve as a brace to make yoke A more rigid.

The part marked U is formed identical as to size with part V and is likewise attached rigidly to yoke A. The main purpose of this part is to fasten coil spring L in Figure 3 and to receive the spring tension adjusting member Q. Too it serves as a brace to add strength and rigidity to yoke A.

The coil spring adjustably connected to Q serves the purpose of pulling the parallel bars holding the teeth or cutting members (F and J) together around the plant stalk and supplying the necessary pressure to cause the cutting members or teeth in the parallel bars to cut the bark from the plant stalks. It also supplies the tension necessary to hold the same parallel bars containing the cutting members open when trigger P is set against part V. As stated the spring is adjustably connected to member Q on one end. The other end is connected to the cutting member or teeth in parallel bars J.

The brace marked T extending from a point between U and V on the yoke A to a point C on yoke A and is fastened at both ends to yoke A serves the purpose of rendering the yoke A and the handle D where considerable strain m ght exist, more substantial and rigid.

Figure 4 is a detail of the cutting and scraping members or teeth. This particular drawing shows the teeth formed from one piece of metal, however they can be made of more than one piece and by proper care in assembly be so placed that the same purpose can be accomplished. Viewing Figure 4 from the top the arcs contained between the numbers 2 to 3, 3 to 5 and 5 to 7 and viewing the figure from the bottom the arcs contained between the numbers 1 to 4, and 6 to 8 constitute the cutting edges of the member. The perpendicular sections 1 to 2, 4 to 3, 6 to 5 and 8 to 7 constitute the teeth proper and serve the dual purpose of cutting the bark and scraping it from the stalk. The opening between the square made by the points numbered 1, 2, 3, and 4 which edges come into contact with the stalk are smaller than the corresponding openings at the rear of these points. The same is true of the openings formed by the squares made by the points numbered 3, 4, 6 and 5 and 5, 6, 8 and 7. The purpose of this is to allow the bark cut from the stalk to pass through the openings readily thereby preventing the clogging of the openings with bark and sap and making the teeth self cleaning. Too this allows the teeth to be sharpened, if necessary, with less interference.

Referring to Figure 3: Cutting and scraping members numbered 1, 2 and 3 in parallel bars F and 6, 7 and 8 in parallel bars J conform to the arc of the same circle. Cutting and scraping members 1, 3 and 4 in parallel bars F and 5, 6 and 8 in parallel bars J conform to the arc of the same but a larger circle than those above referred to. For belting small or medium sized stalks cutting members 1, 2 and 3 and 6, 7 and 8 are brought into use. For belting larger stalks cutting members 1, 3 and 4 in parallel bars F and 5, 6 and 8 in parallel bars J are brought into use. For extremely large stalks teeth and scraping members 1 and 4 in parallel bar F touch the stalk first followed by cutting and scraping member 5 in parallel bar J touching next and if cutting and scraping member 8 in parallel bars J does not touch the stalk then parallel bars J pivot on cutting and scraping member 5 caused from the spring tension exerted by coil spring L, thereby causing the bent trigger end of parallel bars J to tend to pull away from parallel bars O. This pull is exerted on the pin passing through parallel bars J and parallel bars O causing the pin to push up on flat spring R until the forward or open end of parallel bars J are moved sufficiently toward the stalk for cutting and scraping member 8 to be brought firmly into contact with the stalk to be belted. This movement of the trigger end of parallel bar J away from parallel bars O causes parallel bars J to pull the hinging pin with it and the pin moving in slot S toward lapped end of parallel bars O compresses flat spring R. The only need for the slots in the ends of parallel bars O is to insure the belting of extremely large stalks.

From the foregoing description taken in connection with the drawing it will be noted that my implement can be used without tiring the user as the user stands in an erect position removing all strain and tension from the back, and this is a most important feature of my invention and makes it far more practical and useful than devices now in use.

I claim:

1. An implement of the character and for the purpose stated, comprising a frame, a handle connected with said frame, said frame being arranged horizontally and said handle extending upwardly from said frame, a movable member carried by said frame, a second movable member mounted on said frame, and cutting members or elements carried by said movable members for removing the bark from the plant.

2. An implement of the character and for the purpose stated, comprising a frame, a handle connected with said frame, said frame being arranged horizontally and said handle extending upwardly from said frame, a movable member carried by said frame, a second movable member mounted on said frame, and cutting members or elements carried by said movable members for removing the bark from the plant, said movable member having a spring connection with the frame.

3. An implement of the character and for the purpose stated, comprising a frame, a handle connected with said frame, said frame being arranged horizontally and said handle extending upwardly from said frame, a movable member carried by said frame, a second movable member mounted on said frame, and cutting members or elements carried by said movable members for removing the bark from the plant, said cutting members being of open or box shape and having segmental or curved cutting edges.

4. An implement for the purpose described comprising a supporting frame and a pair of movable jaws pivoted together and also having a pivotal connection with said frame, cutting elements in said jaws whereby a longitudinal movement of the frame will cause a circular movement about a stationary object such as a plant stem located between said jaws.

5. An implement for the purpose described comprising a supporting frame and a pair of jaws pivoted together and having a pivotal support to said frame, a cutting element supported by said jaws and a spring to move one of said jaws toward the other to a closed position against a stationary object between said cutting elements.

6. An implement for the purpose described comprising a supporting frame having a handle to move the frame in a longitudinal direction, a pair of jaws carrying cutting elements and having pivotal connection to said frame, means for exerting pressure on one of these jaws to cause them to close, said means also having a connection with the supporting frame to cause the pair of jaws to move around its pivotal connection with said frame in one direction when the frame is moved longitudinally.

7. An implement for the purpose described comprising a supporting frame, a pair of jaws pivotally connected together and having a pivotal connection with said frame, a spring connected to one of said jaws to cause it to move toward the other jaw to engage and hold a stationary object placed between the jaws, means on the frame to engage the spring-pressed jaw when in a normal position to hold the jaws apart and to release said jaws to move to a closed position upon a longitudinal movement of the frame.

8. An implement for the purpose described comprising a supporting frame, a pair of jaws having pivotal connection with said frame, said jaws being also pivoted together and carrying cutting elements, means for holding said jaws separated when the frame is in a normal position, and a spring for closing said jaws upon the movement of the frame from the normal position to cause the cutting elements to engage a stationary object such as a stalk stem placed between the cutting elements, said jaws and cutting elements being moved in a circular position around said stationary object upon a longitudinal movement of said frame.

9. An implement for the purpose described comprising a supporting frame, a pair of jaws pivoted together, cutting elements carried by said jaws, said pair of jaws also having pivotal connection with said frame, means for holding the jaws in a normal position on the frame, a spring connected at one end to one of the jaws and at the other to the frame, the connection being such that the spring will cause the jaws to close upon a horizontal movement of the frame and tend to move the jaws and cutters around a stationary object placed between the jaws when the frame is moved in a longitudinal direction.

WILLIAM EAGLETON KNIGHT, Jr.